Oct. 9, 1934.  G. W. McKEE  1,976,080
FUEL BURNING APPARATUS
Filed June 17, 1931   2 Sheets-Sheet 1
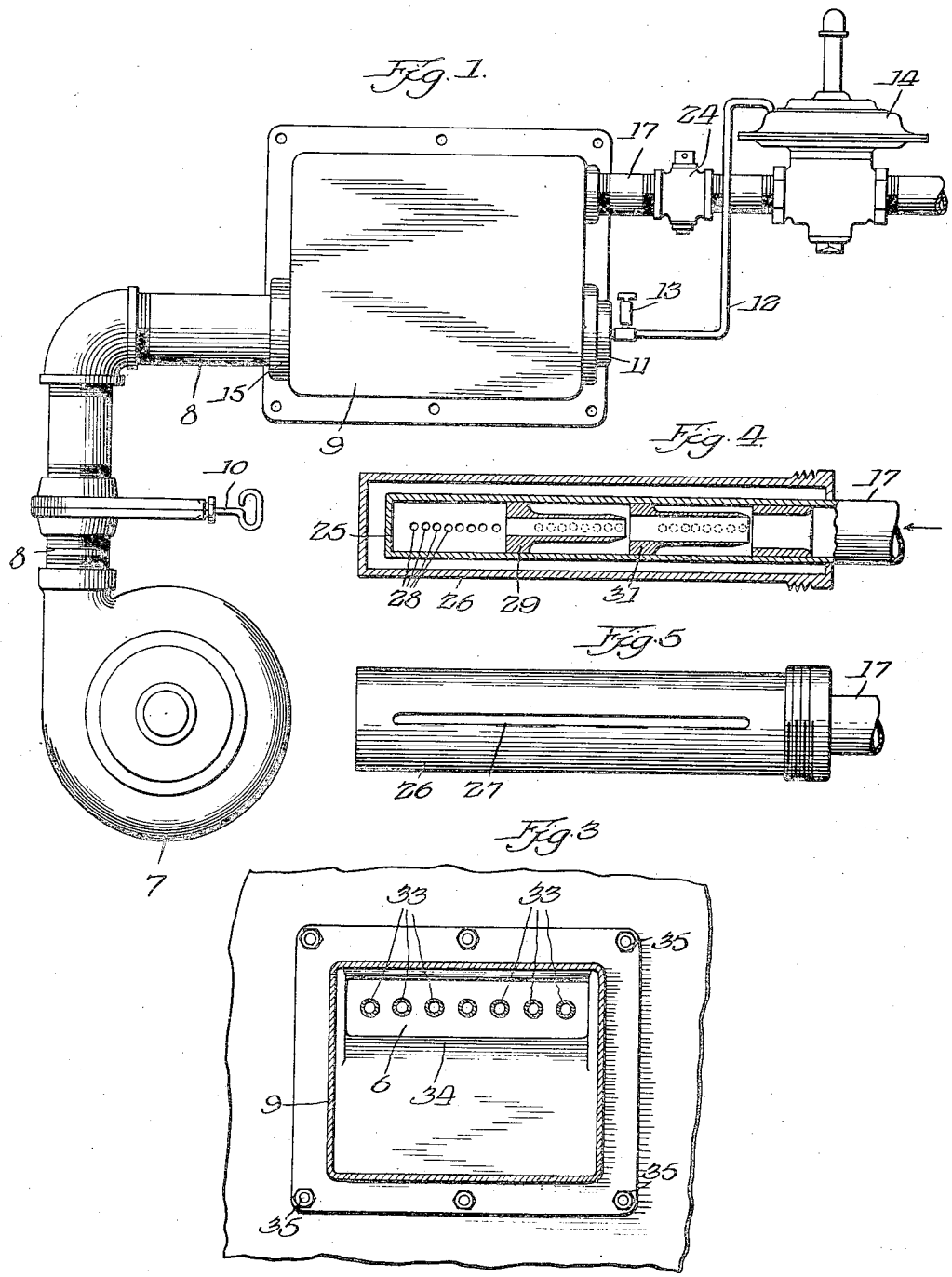

Oct. 9, 1934.   G. W. McKEE   1,976,080
FUEL BURNING APPARATUS
Filed June 17, 1931   2 Sheets-Sheet 2
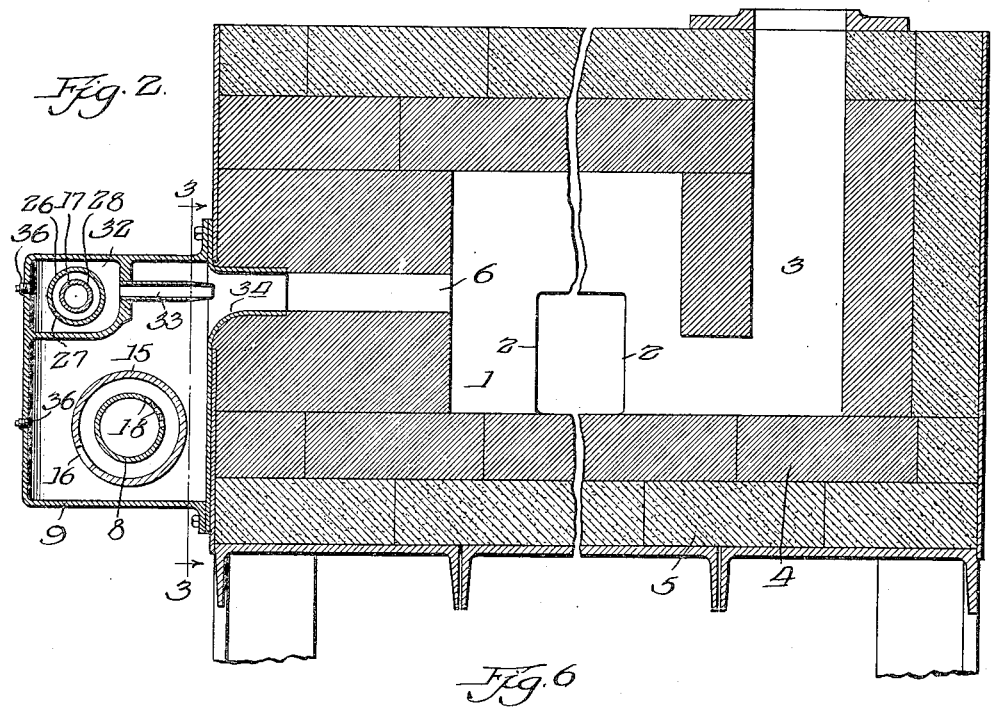
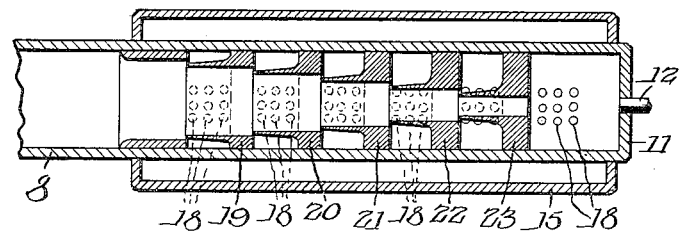
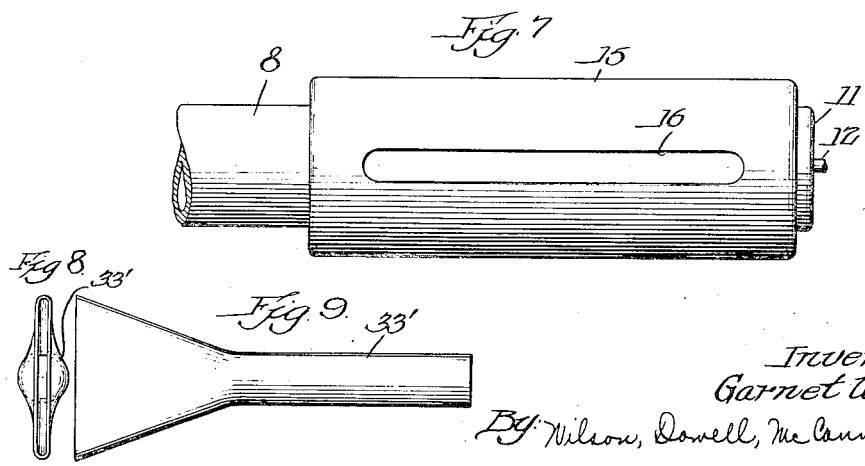
Inventor:
Garnet W. McKee
By Wilson, Dowell, McCanna & Pelur
Att'ys Patented Oct. 9, 1934

1,976,080

UNITED STATES PATENT OFFICE 1,976,080

FUEL BURNING APPARATUS

Garnet W. McKee, Rockford, Ill.

Application June 17, 1931, Serial No. 545,027

2 Claims. (Cl. 158—118)

This invention pertains to methods and apparatus for proportioning and delivering gas and air to produce what is called a luminous flame.

Heretofore in the art of burning gas in furnaces and other heating devices considerable effort and ingenuity have been exercised in proportioning the gas and air and delivering them in thoroughly mixed condition to the zone of combustion, delivering ordinarily carefully proportioned quantities of gas and air to produce a blue flame and avoiding delivery of excess gas or excess air.

While the blue flame heretofore regarded as highly desirable yielded very efficient utilization of the heat units available in the gas, such a flame does not yield as much radiant heat as does a luminous flame, or yellow flame, produced by burning gas in a richer mixture. A luminous flame with its larger proportion of radiant heat is highly desirable for many heating operations, and is very effectively used if the gas is allowed to move with a relatively low velocity while burning, in what is termed in the art a "lazy" flame. Where the furnace volume is considerable and its horizontal cross-section great, it is most desirable to have this luminous flame widely dispersed as it enters the combustion chamber to distribute as widely and as uniformly as is possible within practical limits the radiant effect of the flame. Whereas in the past the blue flame was ordinarily delivered into the combustion chamber at high velocity and in one or more relatively small cylindrical or conical streams, I prefer to deliver the luminous flame in a widely dispersed sheet, as may be secured by delivering the air and the gas through an aperture of rectangular shape, usually having a great horizontal dimension and small vertical dimension. The delivering of the air and gas through such an elongated aperture at low velocity without premixing is not easily accomplished as the necessity still exists for proportioning the gas and air, but they cannot be proportioned readily when moving at such low velocity in the manner heretofore used with high velocity mixers, wherein either the gas or the air at a high pressure entrained the other.

This invention aims to provide methods for proportioning gas and air and delivering them at low velocity in condition suitable for creation of a luminous flame. Normally the air and gas will be delivered at equal velocities but the apparatus described is so arranged that they can be delivered at different velocities to secure the flame characteristics desired for a given heating operation.

Another object of this invention is to provide means for proportioning and controlling the delivery of gas and air so that the two may be discharged into a combustion chamber in a thin and relatively wide stream suitable for luminous combustion.

Another object of this invention is to provide apparatus for performing the above methods and so constructed as to operate accurately free from maintenance troubles and susceptible of delivering variable quantities of gas and air.

Other numerous objects and advantages of the invention should become apparent from a perusal of this specification.

In the drawings:

Fig. 1 represents a side elevation of a burner box and fluid delivery apparatus;

Fig. 2 is a vertical sectional view of such a burner box mounted on the side of a furnace;

Fig. 3 is a vertical sectional view on the line 3—3 of Fig. 2;

Fig. 4 is a vertical sectional view of the gas dispersing unit;

Fig. 5 is an elevation of the same unit looking directly toward its gas outlet;

Fig. 6 is a sectional view of the air dispersing unit;

Fig. 7 is an elevation of the air dispersing unit looking directly toward its air outlet;

Fig. 8 is an end elevation of a modified form of gas delivery tube; and

Fig. 9 is a side elevation of the same tube.

Referring now to the drawings, the furnace consists of a combustion chamber 1 of the usual box-like shape which, of course, may have any dimensions or even something different from a box-like shape which is provided with a door way 2, which may or may not be closed with a door, and a flue 3. A suitable refractory lining 4 will usually be provided surrounded by a heat insulating wall 5. As this furnace is intended to be supplied with a luminous flame there is provided a fuel delivery passage 6 which has, as shown, a relatively small vertical dimension and a considerably greater horizontal dimension. The shape of this passage may be better understood by reference to Fig. 3. From this passage a rather wide spread stream of slowly moving gas and air can be delivered, which will spread over a considerable area of the combustion chamber and impart its radiant heat over a large area. The relative proportions of the width of the passage 6 and the width of the combustion chamber into which the gas and air are delivered are subject to considerable variation, depending upon the character of the heating operation to be performed. It should be understood, of course, that the shape and location of the passage 6 are subject to much variation.

Ordinarily this apparatus must be capable of delivering at different times different quantities of gas and air so that the furnace temperatures may thus be varied, or the amount of heat produced in the furnaces varied. I provide a blower 7 of the usual construction, the details of which need not here be shown but will ordinarily consist of an electric motor, not shown, and the air propelling unit connected with a pipe 8 in which is disposed a valve 10. For the purpose of regulating the quantity of air delivered the valve 10 may be operated manually or under thermostatic control and the speed of the motor may be varied manually or by thermostatic control. The burner box consists of a casing 9 into which the air pipe 8 enters. The end of this pipe is closed at 11 except for a small tube 12 provided with a valve 13 which leads to the zero governor generally indicated as 14. The valve 13 is a needle valve of commonly known construction for regulatably bleeding air from pipe 12 to the atmosphere to aid in regulating the pressure transmitted to the governor diaphragm.

Surrounding the closed end of the air pipe 8 is a cylinder 15 provided with an elongated aperture 16 through which aperture the air is delivered into the burner box. The air pressure as transmitted through the tube 12 is utilized to control the zero governor 14 and thereby admit greater or less quantities of gas through the pipe 17 in accordance with variations in pressure of the air, these latter variations being secured by the manual or automatic control of the valve 10 or blower 7 or some equivalent thereof.

In order that the air may be dispersed and distributed to the passage 6 at low velocity but with a uniform pressure and velocity at all points between the opposite ends of the passage 6, the air is first dispersed from the pipe 8 into the cylinder 15 with uniform pressure from end to end of that cylinder. This is secured by providing a large number of small apertures 18 and a plurality of cones 19, 20, 21, 22 and 23 having central apertures, which have different cross-sectional areas decreasing, as shown in the drawings, toward the closed end of the pipe 8, as will be obvious from an inspection of Fig. 6. The air pressure is thus prevented from piling up at the end of the pipe 8 and by proper proportioning and positioning of the apertures and cones the air may be dispersed from the pipe 8 into the cylinder 15 with a pressure and velocity which is uniform from end to end. The air emerging from the ports 18 is baffled against the inner walls of the cylinder and finally emerges through the port 16 into the burner box 9 flowing then into the passage 6 at low velocity and in a smooth, even stream substantially without eddy currents at the point of delivery.

The zero governor 14 is of the usual construction, and needs no description to those skilled in this art. The pipe 17 is provided with a valve 24 and extends into the burner box terminating at a closed end 25. Surrounding the pipe 17 within the burner box is a cylinder 26 having an elongated aperture 27. Both cylinders 26 and 15 are removable and readily separable from the apparatus so that new cylinders with different sized apertures may be supplied, if desired. For the purpose of dispersing the gas into the cylinder 26 from the pipe 17 with a pressure and at a velocity which is uniform from end to end of the cylinder, I provide a plurality of small apertures 28 and a plurality of cones such as the cones 29 and 31 which function as do the cones and apertures in the air dispersion unit shown in Fig. 6 and described above. The gas discharged through the aperture 27 emerges into a small gas expansion chamber 32 which is formed within the burner box and is discharged from this chamber through a plurality of tubes 33 into the entrance of the passage 6. Tubes 33', shown in Figs. 8 and 9, flattened at their delivery ends may be substituted for the tubes 33. By means of the zero governor the gas flow is so regulated that it emerges through the tubes 33 into the fuel delivery passage 6 at only slightly above atmospheric pressure, preferably at about $\frac{2}{10}$ of an inch of water column.

Thus both the gas and air are delivered to the passage 6 at a pressure very slightly above atmospheric pressure and naturally will flow slowly through the passage. During their flow through the passage the gas and air will not mix to any very large extent as the usual laning effect will prevail and mixture, by reason of the absence of agitation of fluid currents, will be largely prevented. Therefore the flame produced in the combustion chamber, which will be a luminous flame aptly characterized as a "lazy" flame billows about the fire box radiating and otherwise transmitting its heat to the combustion chamber interior and contents. Because of the lack of premixing there is no danger of backfiring through the passage 6.

The laning effect above mentioned is that characteristic which gases have of remaining in their own separate lanes if they are so delivered in a common stream even though the lanes contact with one another. Because of their different densities they have a tendency, if once delivered in a common stream in separate lanes, to continue to flow in their separate lanes without any substantial admixture, provided no factors intrude which would cause turbulence and hence intermingling of the lanes.

As a convenient means of attaching the burner box and to permanently maintain the proper shape of the inlet passage, it is preferable to use a metal liner 34 extending part way into the passage 6. The burner box is then preferably bolted through the liner 34 by means of the bolts 35 to the furnace wall. In the outer face of the burner box 9 it is well to provide apertures ordinarily closed by plugs 36 which may be removed at times for the testing of the fluid pressures within the chamber 32 and the major portion of the casing 9.

In the operation of the device the quantity of gas and air delivered to the furnace for raising or lowering its temperature is conveniently regulated by manual or thermostatic control of the blower 7 or the valve 10. As the air pressure thus varies this pressure acting through the tube 12 will increase or decrease the flow of gas through the pipe 17 into the burner box. The two dispersion units will cause the fluids which they respectively control to emerge and flow into the passage 6 at low velocity and with uniform pressure and velocity throughout all portions of the cross-sectional area of the entrance of this passage. Thus a slowly moving flame of uniform intensity and characteristics will emerge from all portions of the narrow aperture 6 to produce the desired uniform heating effect in the fire box.

It should be understood that whereas the drawings illustrate a method of controlling the air and gas such as would be practiced where the gas pressure might ordinarily be at from 2 to 6 inches of water column, yet the principles of this invention are readily utilized even when the gas pressure is considerably higher, perhaps even exceeding the air pressure, as will be readily appreciated by those skilled in this art. It will be recognized that this invention is readily susceptible of considerable modification and that it may be utilized in various embodiments, all possessing the advantages of this invention, though differing in form, without departing from the spirit and scope of the invention as expressed in the claims which follow.

Having described my invention, I claim:

1. Burner apparatus comprising a housing having a wall dividing it into two compartments, a separate tube extending into each compartment, each tube having a plurality of nozzles arranged successively in longitudinal alignment through the tube, each nozzle providing a central passage through it and contacting the walls of the tube to divide it into several chambers, each tube having a plurality of relatively small apertures in the wall of each of said chambers for discharging gas, a pipe surrounding the apertured portions of each tube for receiving gases discharged from said apertures, a common delivery duct being provided on said housing connected with one of said compartments for discharging gases from both said tubes, means for supplying one of said tubes with a combustible gas substantially at atmospheric pressure, means for supplying the other tube with air, each of the pipes surrounding the tubes having an elongated aperture discharging into its associated compartment, and means connected with the compartment receiving combustible gas for delivering into said duct a plurality of streams of gas.

2. Apparatus for producing a combustible mixture comprising a housing having a small compartment and a relatively larger compartment and a discharge duct connected with the larger compartment, means including a tube extending into the smaller compartment for delivering combustible gas thereinto, means including a tube for delivering air into the larger compartment, apertured walls dividing each tube into a plurality of chambers, a plurality of perforations in the chamber walls of each tube for discharging the gas and air respectively therefrom, a pipe surrounding the perforated portions of each tube for receiving the fluid discharge therefrom, each of said pipes having an elongated aperture discharging into its associated housing compartment, and a plurality of conduits connected with the smaller compartment of said housing positioned for conducting the gas therefrom into said duct.

GARNET W. McKEE.